United States Patent [19]

Mathur et al.

[11] Patent Number: 5,742,825
[45] Date of Patent: Apr. 21, 1998

[54] OPERATING SYSTEM FOR OFFICE MACHINES

[75] Inventors: Sharad Mathur, Redmond; Franklin D. Fite, Jr.; Arul Menezes, both of Bellevue; Kim Stebbens, Redmond, all of Wash.

[73] Assignee: Microsoft Corporation

[21] Appl. No.: 803,845

[22] Filed: Feb. 28, 1997

Related U.S. Application Data

[63] Continuation of Ser. No. 316,026, Sep. 30, 1994, abandoned.
[51] Int. Cl.$^6$ ........................................... G06F 9/40
[52] U.S. Cl. .................................. 395/680; 395/677
[58] Field of Search .............................. 395/677, 680

[56] References Cited

U.S. PATENT DOCUMENTS

| | | | |
|---|---|---|---|
| 5,012,409 | 4/1991 | Fletcher et al. | 395/673 |
| 5,210,873 | 5/1993 | Gay et al. | 395/677 |
| 5,220,653 | 6/1993 | Miro | 395/677 |
| 5,237,684 | 8/1993 | Record et al. | 395/682 |
| 5,396,345 | 3/1995 | Motoyama | 358/448 |

OTHER PUBLICATIONS

Richter, Jeffrey, "Advanced Windows NT™", Microsoft Press, 1994, pp. 200–204.
Prosise, Jeff, "Windows Multitasking", PC Magazine, May 17, 1994, vol. 13, No. 9, pp. 261–262, 264.
Morgan, Kevin D., "The RTOS Difference" BYTE, Aug. 1992 p. 161 vol. 17, No. 8.
Eglowstein, Howard & Stanford Diehl "Reviews", BYTE, Sep. 1989 p. 148 vol. 14 No. 9.
Ripps, David L, "The multitasking mindset meets the operating system" EDN, v35, n20, p.115(9), Oct. 1990.
Cortese, Amy, et al., "Microsoft, partners polish office-automation specs", PC Week, v10, n22, p.1(2), Jun. 1993.
Shear, David, "Three DSP RTOSs are ready to merge with Windows", EDN, v39, n13, p.29(4), Jun. 1994.
Dougherty, Brian, "David and Goliath Clash; Geoworks and Microsoft fight it out over Modular Windows", Digital Media, v2, n9, p.1(3), Feb. 1993.
*Inside Windows NT*, by Helen Custer, "Chapter 4: Processes and Threads", Microsoft Press, 1993, pp. 83–113.
*Microsoft Windows 3.1 Guide to Programming*, "Chapter 1: Overview of the Windows Environment", Microsoft Press, 1992, pp. 7–8.
*PC Magazine*, "Windows Multitasking", by Jeff Prosise, May 17, 1994, vol. 13, No. 9, pp. 261–262, 264.

*Primary Examiner*—Kevin A. Kriess
*Assistant Examiner*—St.-John Courtenay, III
*Attorney, Agent, or Firm*—Klarquist Sparkman Campbell Leigh & Whinston LLP

[57] ABSTRACT

A multitasking, graphical windowing operating system for an office machine supporting real time processing, including a method for supporting real time processing in the operating system. The operating system includes a kernel having a non-preemptive scheduler for scheduling windowing applications and a preemptive scheduler for scheduling real time applications. The kernel includes a messaging subsystem for communication among process in the system including both the real time and windowing applications, and further includes an event semaphore maintained by the kernel to manage scheduling. The method includes grouping windowing applications together for scheduling purposes and scheduling windowing applications non-preemptively. The method further includes determining priority of real time applications and scheduling real time applications preemptively with the windowing applications based on priority.

13 Claims, 6 Drawing Sheets

OPERATING SYSTEM FOR OFFICE MACHINES

This appliction is a file wrapper continuation of application Ser. No. 08/316,026, filed on Sep. 30, 1994, now abandoned.

FIELD OF THE INVENTION

The invention generally relates to operating systems. More specifically, the invention relates to a multitasking, real time operating system for an office machine.

BACKGROUND AND SUMMARY OF THE INVENTION

Today's office machines are becoming increasingly more sophisticated. With the addition of advanced processors, improved interfaces, and communication interfaces to personal computers, typical office machines such as copiers, fax machines and printers can be equipped with powerful new features. Such features include enhanced scanning and printing capabilities, increased user personalization and security, and communication of editable documents among different types of office machines and PCs. In the future, many of these new features will be implemented and controlled using software programs executed within the office machine.

To support these application programs, the office machine must be equipped with an operating system. An operating system is the software responsible for controlling the allocation and usage of hardware resources such as memory, central processing unit (CPU) time, and peripheral devices. As in a typical computer, the operating system provides the foundation on which application programs are developed. To facilitate development of application programs, the operating system should have a well-defined application program interface (API). An API is a set of routines that application programs use to access lower level services performed by the operating system.

The operating system performs a number of important services for the application programs including module management, inter-process communication (IPC), and scheduling. A software module includes processes and dynamic linked libraries (DLLs). A process is a program or part of a program consisting of a coherent set of steps to be executed. Often the term "process" is used interchangeably with the term, "task." A DLL is software that may be linked with a process. DLLs prevent duplication of code in the system because several processes can share the same DLL. The operating system may perform module management by supporting the linking, loading, and execution of modules in the system. The operating system allows for communication among processes in the system by providing an IPC mechanism. This IPC mechanism allows application programs to talk to each other and to talk to processes in the operating system. Communication among processes may play an important role in scheduling of processes to be executed by the CPU. By controlling scheduling, the operating system controls usage of CPU time by processes in the system.

In tomorrow's intelligent office machine, the operating system must support multitasking and real time processing, two attributes of an operating system that are closely related to scheduling. Multitasking is a scheduling scheme that allows the CPU to work on more than one process or task at a time. Real time processing refers to the scheduling constraint that a process must be scheduled and executed within a predictable period of time because of some external, "real world" timing requirement. Real time processing is critical in an office machine where application programs must be run in predictable period of time. For example, an application handling an incoming phone call in a fax machine must process the incoming data in "real time" or else the fax machine may ultimately hang-up. In a multitasking operating system, the operating system must implement a scheduling scheme so that real time applications are scheduled to run in a predictable period of time. To support real time processing, an operating system needs to have some form of preemptive scheduling. Preemptive scheduling is the process of interrupting a currently running process to run a higher priority process, such as a real time application program. To ensure that the real time application is processed in a predictable period of time, the operating system needs to be able to gain control of the CPU, possibly preempting the currently running process, and schedule the real time process regardless of other processes in the system.

In addition to real time processing, another critical attribute of the operating system for tomorrow's intelligent office machines is that it have a graphical windowing environment. A windowing environment refers to the user interface to an operating system that presents the user with specially delineated areas of the display screen called windows. Each window can act independently, as if it were a virtual display device. Windowing environments are immensely popular in personal computers today. Windows from Microsoft Corporation of Redmond, Washington, is an example of a multitasking graphical user interface environment that runs on MS-DOS based computers. Other examples of windowing environments include the Apple Macintosh Finder from Apple Computer, Corp. and the OS/2 Presentation Manager available from IBM Corp.

Operating systems having both a graphical windowing environment and support for preemptive scheduling currently exist, but are not entirely suitable for an office machine. Operating systems such as OS/2 from IBM Corp. and Windows NT from Microsoft Corp. have a graphical windowing environment and also support preemptive scheduling. These operating systems, however, consume too much memory to be suitable for use in an office machine where memory is typically rather limited.

To address the memory constraints of an office machine, a new operating system could be developed that would consume less memory. This solution, however, is also not acceptable. Developing an entirely new operating system would take a significant amount of engineering effort and would likely not be fully compatible with existing operating systems. In the context of operating systems, compatibility has two key aspects: compatibility with existing application programs, and compatibility with an existing software development environment. Preferably, an operating system for an office machine should address both of these compatibility concerns.

Because of the importance of the compatibility issues, another possible alternative is to modify an existing and widely accepted operating system. By modifying an existing operating system, compatibility with many existing application programs can be maintained. In addition, the modified system can support the same development environment using the same or a similar API.

Though beneficial from the standpoint of compatibility, modifying an existing operating system can give rise to difficult issues in scheduling. The Windows Operating System, for example, does not support real time processing because it is based on a non-preemptive scheduling scheme. An operating system that is based on a non-preemptive scheduling scheme must be modified to include preemptive processing to support real time processing. At the same time, the original non-preemptive scheme must be kept in tact to maintain compatibility with existing applications.

In modifying a non-preemptive operating system to support real time processing, reentrancy problems must be addressed because many of the software modules in a non-preemptive system are non-reentrant.

A software module is reentrant if it can 1) be called by a first program and be partially run; 2) be interrupted by a second program (and either partially run, or run to conclusion), and 3) then be reentered by the first program without loss of information. Conversely, software that is non-reentrant cannot be interrupted and then reentered without loss of information. Reentrancy problems may occur when a real time process preempts another process. For example, if a real time process preempts a process that has called a non-reentrant module and then attempts to call the same non-reentrant module, a reentrancy problem may occur. The non-reentrant module has no way of saving information computed in response to the call from the preempted process.

In light of the foregoing discussion, it is apparent that there are significant design issues involved in developing an operating system for an office machine. An object of this invention, therefore, is to provide a system and method for supporting real time applications in a graphical windowing operating system for an office machine that adequately addresses these design issues.

The invention provides a method and system for supporting real time processing in a graphical windowing operating system. In one embodiment, a method according to the invention includes providing a graphical windowing operating system having a non-preemptive scheduler, a preemptive scheduler, and a messaging subsystem for allowing the schedulers to communicate with processes. The method further includes grouping windowing applications together as one scheduable process called a system process and scheduling windowing applications non-preemptively with the non-preemptive scheduler. The method further includes scheduling the system process and real time applications preemptively with the preemptive scheduler. Preemptive scheduling includes determining whether the currently running process can be preempted, scheduling a process that is ready to be scheduled based on the type and priority of the currently running process, and preempting the currently running process by performing a context switch.

For scheduling purposes, applications may be grouped into two categories: windowing applications and real time applications. Windowing applications may be treated as a single process and scheduled preemptively with the real time applications. This grouping has the advantage of minimizing reentrancy problems in the system by preventing preemption among windowing applications. Windowing applications may then be scheduled non-preemptively for a portion of available processor time, and then preempted by real time applications for another portion of processor time.

In addition to the methods outlined above, the invention provides a system for supporting real time applications in an operating system for an office machine. According to one embodiment of the system, the system includes a kernel having a messaging subsystem, a non-preemptive scheduler for scheduling windowing applications, a preemptive scheduler for scheduling real time applications, and an event semaphore. The messaging subsystem enables real time and windowing applications to communicate with each other and with processes in an operating system using messages.

The messaging subsystem is also used in scheduling. Real time and windowing applications may transition states based upon whether they are posting or getting a message. The messaging subsystem is in communication with the event semaphore for controlling scheduling by communicating the state of a process to the proper scheduler. The non-preemptive scheduler schedules windowing applications non-preemptively, while the preemptive scheduler schedules real time applications preemptively based upon the priority of applications ready to be scheduled.

The system also includes an interrupt module used in scheduling real time applications. For instance, the interrupt module may include a timer coupled to an interrupt service routine for generating a periodic interrupt. When this interrupt occurs, the preemptive scheduler can be given control to schedule real time applications preemptively.

The design of a system according to the invention may vary. For instance, the kernel may be implemented in two pieces: one supporting non-preemptive scheduling, and a second supporting preemptive scheduling. The messaging subsystem may use separate message queues for windowing and real time applications to maintain independence between windowing processes operating in the foreground and real time processes operating in the background. Many other variations are possible and will become apparent in the detailed description to follow.

The methods and systems according to the invention can be used to help build a real time, graphical windowing operating system for an office machine. This operating system can be designed to support non-preemptive scheduling for windowing applications and preemptive scheduling for real time applications. Both forms of scheduling may be accommodated while avoiding reentrancy problems. The invention may be used build an operating system for an office machine that retains compatibility with existing windowing applications as well as an existing development environment.

Further advantages and features of the invention will become apparent with reference to the following detailed description and accompanying drawings.

DETAILED DESCRIPTION

Figure 1:
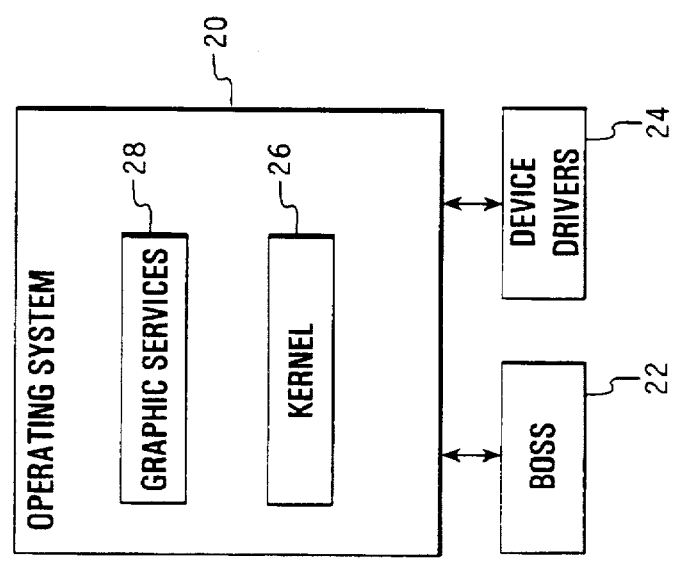
FIG. 1 is a block diagram of the architecture of an operating system according to an embodiment of the invention.

FIG. 1 is a block diagram of the architecture of an operating system according to an embodiment of the invention. This diagram depicts the primary elements of an operating system architecture for an "intelligent" office machine such as high-end copiers, intelligent fax machines, handheld systems, or telephones. The system level architecture includes the operating system 20, basic operating system services (BOSS) 22, and device drivers 24.

The block labeled device drivers 24 includes both device drivers and interrupt service routines (ISRs). These two software elements provide an interface between peripheral devices and the operating system. Typical peripheral devices include disk drives, scanners, printers, modems, and a display device. The device drivers and ISRs provide the following basic functionality for each peripheral device: initialization, including power on testing and reset, device control, the ability to set options in the device through registers, an "open" function allowing a device to be reserved for use by a process, a "close" function freeing the device, a "read" function getting data in either byte or block form to the device, and a "write" function sending data in either byte or block form to the device. The ISRs work with the device drivers to notify higher level software when the device has completed an operation or when it is ready to start one. The format of the device drivers and ISRs in this embodiment is based on the Windows Device Driver standard developed by Microsoft Corp. of Redmond, Wash.

The BOSS module 22 is the underlying framework that separates the operating system from the peculiarities of office machine processor hardware. The BOSS module includes the following functionality: basic start up procedures including Power On and Self Test (POST), low level memory management, device control, fault handling, and system time and date. As part of the start up procedures, the BOSS module gains control of office machine hardware and may perform various self tests of the processor, memory, and other devices such as direct memory address (DMA) devices, interrupt controllers, and timers. BOSS also determines which peripheral devices are installed and operational. After setting up the hardware of the office machine, the BOSS module transfers control to the operating system.

Device drivers control many of the peripheral devices in an office machine. The BOSS module, however, controls devices that are usually considered part of the processor complex such as DMA controllers, interrupt controllers, real time clock, and timers. To control these devices, the BOSS module may provide the operating system with abstract functions that are not hardware specific. The specifics of hardware in a variety of office machines can then be more transparent to the operating system.

The manner in which the BOSS module is implemented is not critical to the invention. The details of the BOSS module depend on the specific hardware in the office machine including the type of processor and memory. In one alternative, the BOSS module may be implemented using PCBIOS (Personal Computer, Basic Input/Output System), in which case PCBIOS would perform initialization tests of hardware devices upon bootup and then transfer control to the operating system. PCBIOS is a set of routines that work closely with the hardware in a PC to support the transfer of information between elements of the system, such as memory, disks, and the monitor. Since PCBIOS is configured for specific hardware found in a PC, it may not be applicable to some office machine architectures. In this case, the hardware manufacturer may develop the hardware abstraction layer within the BOSS module to provide the BOSS functionality described above.

The file system used with the operating system may also effect the design of the BOSS module. Though a file system is not an aspect of an the embodiment of the invention, it may effect how an operating system for an office machine is implemented. An operating system using PCBIOS may also include MS-DOS, the well known disk operating system from Microsoft Corporation to provide a file system. A graphical windowing environment including the Windows kernel could then be built on top of PCBIOS and DOS because the Windows kernel is designed to run in a MS-DOS based system. This alternative may not be suitable because of the added memory consumed by DOS. As another alternative, DOS could be removed entirely, and another file system could be used or the operating system could function without one. In this alternative, the kernel of the operating system would not need to include support for DOS, and thus, could be reduced in size.

Many variations to the BOSS module are possible. It is not necessary to elaborate on the design of the BOSS module because it is not a critical aspect of a system for supporting real time processing. The BOSS module simply provides a foundation upon which a system for supporting real time processing can be built.

The BOSS module, however, may include support for an interrupt used in scheduling real time applications. For example, the BOSS module may support a timer and an interrupt service routine used to transfer control of the processor to a preemptive scheduler on a periodic basis such as every n milliseconds. As another alternative, the BOSS module may include interrupt service routines associated with an input device such as a keyboard or keypad in the office machine. This type of interrupt could also be used to transfer control to a preemptive scheduler when a user presses a key, for example. For simplicity, the software and/or hardware device generating an interrupt along with the associated interrupt service routine will be referred to as an interrupt module in the description of scheduling to follow.

While the Boss module may include such an interrupt module, it does not necessarily have to include one. Alternatively, such an interrupt module could be located in the device drivers module 24 previously described. The interrupt module could also be supported in the timer and serial port hardware and corresponding protect mode interrupt handlers to be described with reference to FIG. 2 below.

The operating system 20 provides a real time multitasking operating environment for an office machine. This embodiment in particular has an API compatible with the Windows API from Microsoft Corp. This operating system allows software developers to use the Windows development environment for PCs to create and test applications for an office machine. The operating system may be run while resident in ROM. Through BOSS 22 and the device drivers 24, the operating system 20 communicates with the hardware of the office machine. Because the BOSS layer absorbs the peculiarities of the office machine hardware, the operating system 20 is highly portable across processors. This particular implementation is designed for a 286 or more advanced processor in the Intel x86 family of processors.

The primary modules in the operating system 20 are the kernel 26, and the graphics services module 28. The kernel 26 is responsible for module (process and dynamic linked library) management and scheduling, interprocess messaging, memory management, and timers. The kernel communicates with application programs through an API. The kernel 26 also communicates with BOSS 22 and device drivers 24. Through an interface to BOSS 22 and the device drivers 24, the kernel obtains the following functionality: timer-device services, interrupt services, and some memory management.

In general, the kernel 26 provides scheduling, memory management, and IPC communication for two kinds of processes: non-preemptive processes that run in the foreground, and preemptive processes that run in the background. The non-preemptive processes may include Microsoft Windows applications and office machine I/O applications using the display device while the preemptive processes may include background processes, not using the display device. The kernel 26 includes services to create and delete these processes, and services to communicate among them. In this embodiment, processes communicate using the standard Windows Inter-Process Communication messaging mechanism. In addition to the Windows IPC messages, the kernel 26 provides additional communication services, including semaphores and event signals. Processes and dynamic linked libraries may manage resource contention with semaphores and may use signals to notify each other of events. For memory management, the kernel 26 implements global pools of standard size memory blocks in order to reduce fragmentation and to speed up dynamic allocation and deallocation of memory.

The graphical services module 28 within the operating system provides a set of user interface services to enable application programs to take advantage of the graphical capabilities of a display on the office machine. The graphics services are provided at two levels: 1) graphics functions to draw graphics primitives like lines, bitmaps, and so on, and 2) high-level user interface commands to draw logical objects like push buttons and windows and to recognize user input.

Figure 2:
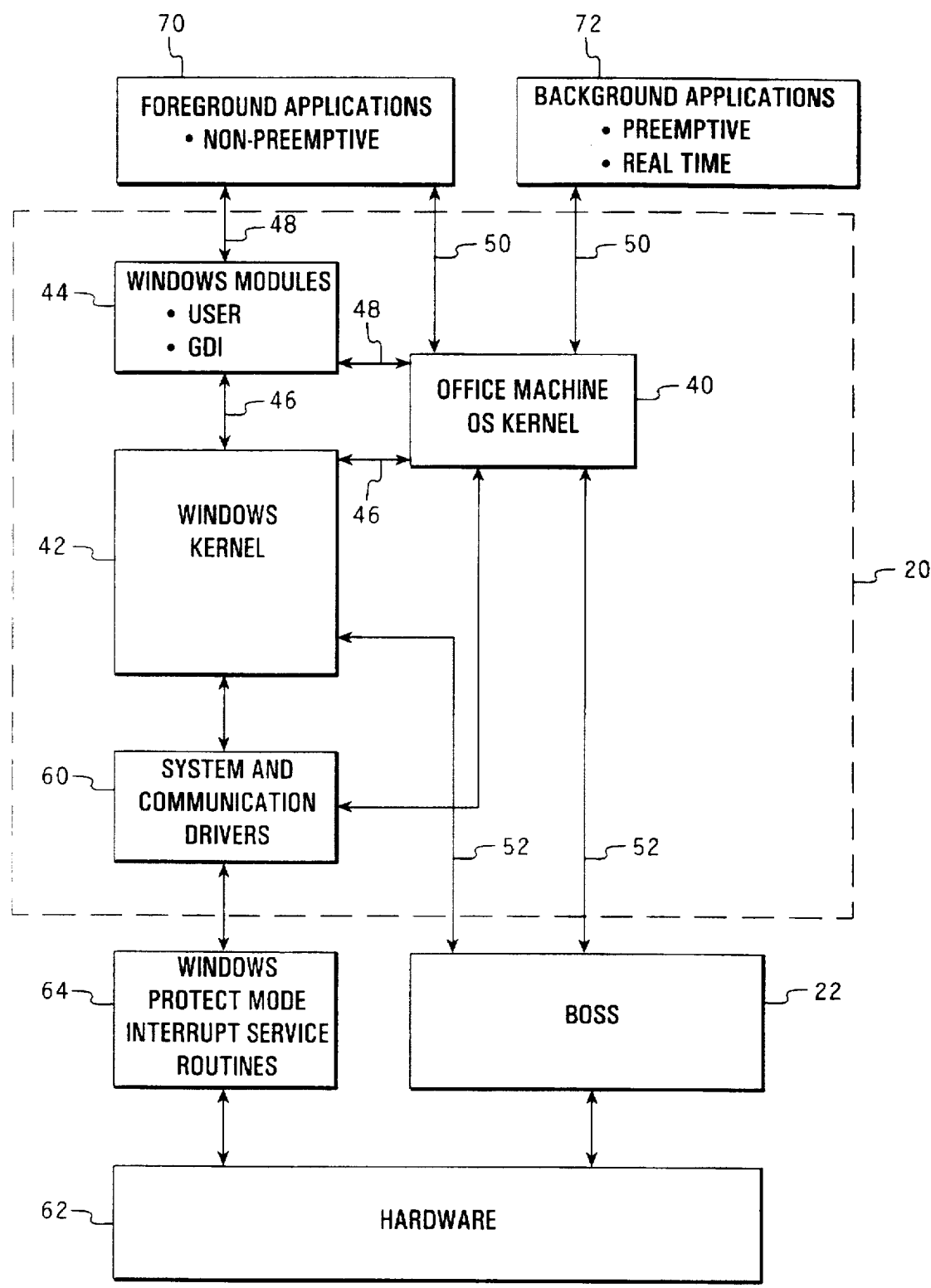
FIG. 2 is a more detailed diagram of the operating system according to an embodiment of the invention.

FIG. 2 is a more detailed diagram of an operating system according to an embodiment of the invention. In this particular embodiment, the kernel 26 is in two pieces: the office machine operating system (OMOS) kernel 40, and the Windows kernel 42. The kernel 26 may also be implemented as a single module as depicted in FIG. 1. This particular implementation, however, uses the Windows kernel 42 and standard Windows modules to provide part of the operating system functionality, namely to support non-preemptive processing of graphical windowing applications. The OMOS kernel provides the added functionality to support preemptive processing for real time applications. The Windows modules 44 correspond to the graphical services module of FIG. 1 and include a graphics device interface (GDI) and a user module. Both the GDI and user module are standard Windows modules and have been well understood in the art.

The operating system includes several interfaces to facilitate interaction between modules in the system. The operating system includes the widely known Windows API published by Microsoft Corporation. The Windows API includes the Windows kernel API, the User Module API, and the GDI module API. The Windows modules 44 and the OMOS kernel 40 may communicate with the Windows Kernel 42 through the Windows Kernel API 46. Applications and the OMOS kernel may communicate with the Windows modules using the user and GDI module APIs 48. The interface between applications and the OMOS kernel 40 is the OMOS kernel API 50. Office machine foreground and background applications may communicate with the OMOS kernel 40 through an OMOS Kernel API 50. The aspects of the OMOS kernel API relevant to the invention are discussed in more detail below in the context of communication in the operating system. The OMOS kernel and the Windows kernel communicate with the BOSS module 22 through a BOSS API 52.

The system driver and the communication driver 60, two of the core drivers provided with Windows, are also included as part of the operating system. The system driver includes timer services that may be used as a basis for timer services in the operating system. The communication driver provides access to the serial communication facilities, and may be used as an interface to allow debugging programs to talk to a terminal connected via a serial port. System and communication drivers communicate with hardware 62 through protect mode interrupt handlers 64 for the timer and serial port hardware, respectively, to allow high speed, efficient handling of interrupts.

At the top of FIG. 2, application programs running in an intelligent office machine are divided into foreground 70 and background 72 applications to reflect at a high level how the operating system interacts with the applications for scheduling purposes. The background applications in this embodiment are real time applications. Real time applications, those that must be executed in a predictable period of time, are scheduled preemptively from the office machine OS kernel 40. These real time applications interface directly to the office machine OS kernel 40 through the OMOS Kernel API 50.

The types of real time applications vary, depending on the type of office machine in which the operating system is installed. In a fax machine, the real time applications may include a fax protocol, a networking protocol, or an application to retrieve a file from memory while a phone transaction is ongoing. In phones, real time applications may include a video conferencing program that updates a display screen 10–30 times a second, a digital telephony protocol such as ISDN (Integrated Services Digital Network), a data modem protocol, or switched voice and data applications enabling the phone to transfer data such as a spreadsheet file during a voice communication. In handheld systems, real time applications may include, for example, wireless communication protocols. Each of these applications must be executed in a predictable fashion to meet timing requirements. While only a few examples of real time applications are listed, it should be understood that many other real time applications are possible.

Foreground applications, including office machine I/O applications and Windows applications, are scheduled non-preemptively. The communication among the non-preemptive applications and the operating system is more complicated because some office machine I/O applications must talk to the office machine OS kernel yet also have access to graphical services. For example, an application that acts as a user interface for a fax machine may need access to the office machine OS kernel 40 for scheduling and communication purposes, and may need access to the display through the GDI and user module 44. Office machine I/O applications, therefore, may communicate with the office machine OS kernel 40, which then communicates with the Windows modules 44.

At the bottom of FIG. 2, the BOSS 22 and protect mode ISRs 64 separate the operating system 20 from the hardware 62 of the office machine. The communication between the operating system 20 and the hardware 62 occurs through protected mode interrupt service routines.

Figure 3:
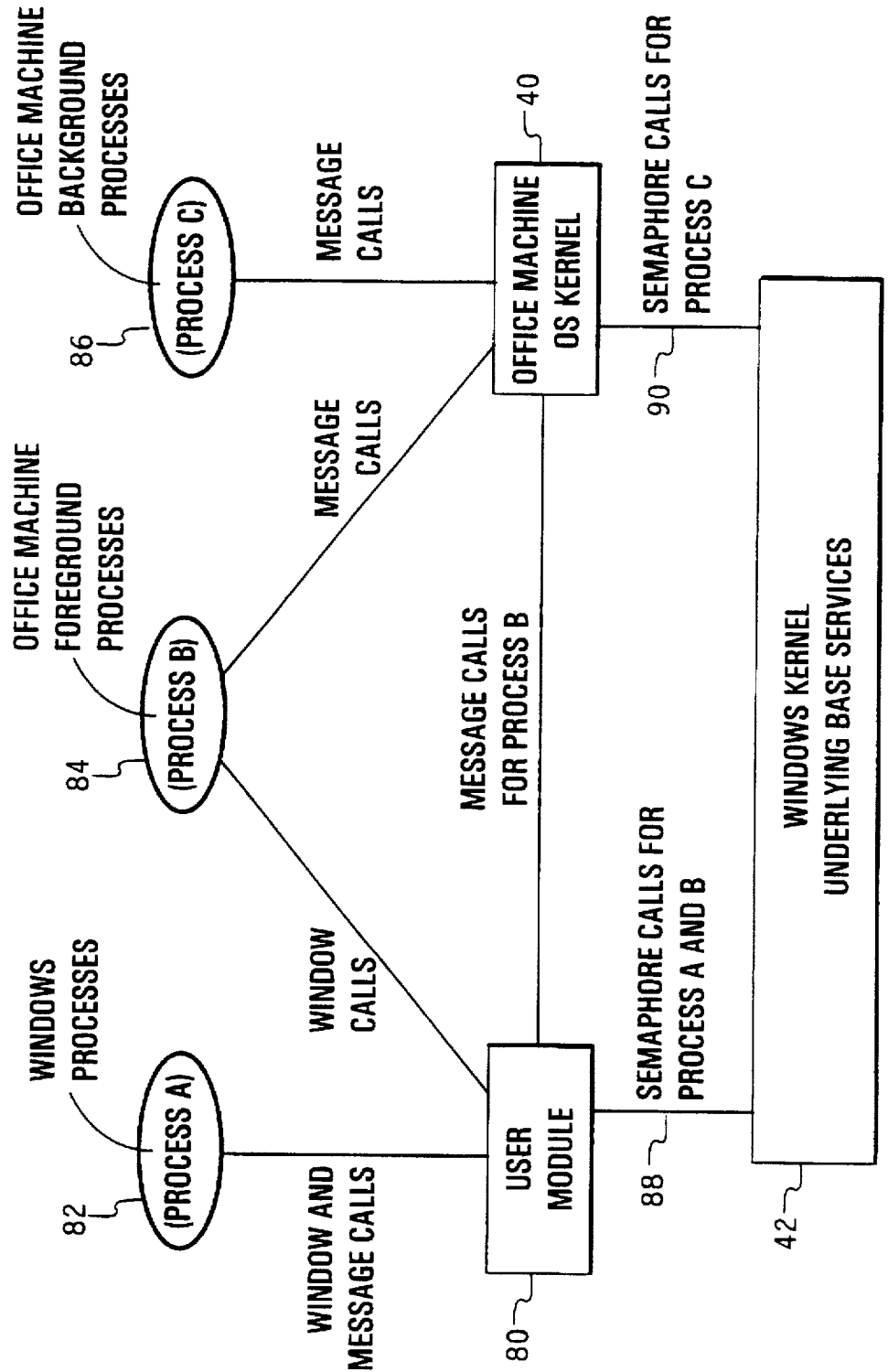
FIG. 3 is a block diagram illustrating communication among software processes within an operating system according to an embodiment of the invention.

FIG. 3 is a block diagram illustrating communication among software processes in the operating system 20. The communication among processes is performed through messages. Each process has a main message loop in which it retrieves messages sent to it from other processes and responds to them. All inputs from I/O devices such as a keyboard or a mouse are sent as messages. Messaging services for Windows applications are implemented in a messaging subsystem in the user module 80. The messaging services, however, need not be located in the user module 80. They can also be implemented as part of the kernel 26 of the operating system 20. This particular implementation includes messaging services in the user module 80 from the Windows operating system, and additionally, includes a messaging subsystem in the office machine OS kernel that is similar to the Windows messaging services. The advantage to having a separate messaging subsystem implemented in the office machine OS kernel 40 is that it enables office machine background processes to operate independently from the user module 80, which is involved in non-preemptive scheduling of foreground processes. Background processes can operate entirely in the background if necessary.

The messaging services provided in the user module are the same as those provided in the Windows operating system. As is widely known in the field, the Windows operating system provides facilities for sending and receiving fixed sized messages similar to the "mailbox" concept in the UNIX operating system. Each process has a message queue to which other processes can add messages using the PostMessage() function. A process can then retrieve message from its queue by calling GetMessage(), which is a blocking function, or PeekMessage(), which is a non-blocking function. With the SendMessage() function, the Windows Operating System provides a method whereby a process can have its message processed synchronously. SendMessage() may be used for display related events that must be processed in fixed orders. A similar effect may be achieved by posting a message with PostMessage() and then blocking using GetMessage() on a reply to the posted message.

Like the messaging services in the user module 80, the office machine OS kernel 40 has a messaging subsystem. The messaging subsystem allows the office machine OS kernel 40 to communicate directly with non-Windows processes as well as the Windows kernel 42 and the user module 80. The message subsystem design includes a message queue data structure and two primary functions called PostAppMessage() and GetMessage(). These functions behave similarly to the PostMessage() and GetMessage() functions in the user module, but have been implemented separately to maintain independence of background processes. A single messaging subsystem could be implemented for all processes at the sacrifice of this independence. More details of message subsystem design will follow a description of the communication in the operating system.

Referring again to FIG. 3, processes can be categorized into three groups for the purposes of communication within the operating system. The three categories of processes are: 1) Windows processes (Process A) 82, 2) office machine foreground processes (Process B) 84, and 3) office machine background processes (Process C) 86. The first type of processes are typical Windows processes 82. These processes may include typical Windows applications that are not "real time" and thus need not have any access to the office machine OS kernel 40. The second type of process 84 must be able to access both the background processes 82 and the user module 80. A typical application would be a user interface for a fax machine that would need to gather information from a background process and display this information using the user module 80. Finally, the third type of process 86 operates in the background and does not need to communicate with any Windows process 82. A process is classified in one of these three categories by the way it is compiled. Office machine processes 84, 86 are compiled so that all message calls are directed to the office machine OS kernel 40.

Communication between Windows processes 82 and the user module 80 occurs as it ordinarily would in the Windows operating system. The user module creates a data structure for a newly loaded process in a function called StartApp(). The Windows process typically calls StartApp() as part of start up code added by a dynamically linked library called the c run time library. At start up, the user module 80 adds the Windows process 82 to its internal data structures and allocates a message queue. If the process does not call StartApp(), then the user module 80 does not know of its existence. To deallocate message data associated with a Windows process 82, the user module 80 sets a signal procedure that the Windows kernel 42 calls when the process dies. Typically, this signal procedure is carried out using a SetTaskSignalProc() kernel function within the StartApp() call.

The user module 80 controls the state of the Windows processes 82 communicating with it. A process basically has three states: blocked, ready, and running. As described above, a Windows process 82 is blocked during a GetMessage() call. In response to a blocking call such as GetMessage(), the user module 80 blocks a process. The user module 80 controls the process "ready" and "running" states by deciding when to place a process in a run queue. To communicate the state of a Windows process 82 to the Windows kernel 42, the user module controls an event semaphore within the Windows Kernel through a semaphore call 88. Using this event semaphore, the Windows kernel 42 then performs non-preemptive scheduling of Windows processes 82.

Communication with an office machine background process 86 is handled entirely by the messaging subsystem of the office machine OS kernel 40. The office machine OS kernel 40 maintains a message queue and controls the event semaphore for background processes. Like the user module, the office machine OS kernel 40 controls an event semaphore in the Windows kernel 42 through a semaphore call 90. The office machine OS kernel 40 processes all of the message calls for background processes.

Communication of office machine foreground processes 84 is more complicated because these processes must interact with both the user module 80 and the office machine OS kernel 40. Both the user module 80 and the office machine OS kernel 40 cannot maintain a message queue for this type of process because of the problems inherent in having a process interact with two separate messaging subsystems. As a result, the office machine OS kernel 40 does not maintain a separate message queue for an office machine foreground process 84. The office machine OS kernel 40 traps all message calls for this process and communicates them to the user module 80. The user module 80 maintains the message queue and controls the event semaphore for the process.

The messaging subsystem in the office machine OS kernel 40 processes major message calls as shown in the table below.

| Type of Call | Process Types Involved | Processing Required |
|---|---|---|
| PostMessage | Process C - Process C | OMOS kernel does internal PostAppMessage |
| PostMessage | Process C - Process B | OMOS kernel calls USER PostMessage |
| PostMessage | Process C - Unknown (type A) | OMOS kernel calls USER PostMessage |
| PostMessage | Process B - Process C | OMOS kernel does internal PostAppMessage |
| PostMessage | Process B - Process B | OMOS kernel calls USER PostMessage |
| PostMessage | Process B - Unknown (type A) | OMOS kernel calls USER PostMessage |
| GetMessage | Process C | OMOS kernel does internal GetMessage |
| GetMessage | Process B | OMOS kernel calls USER GetMessage |

The messaging subsystem of the office machine OS kernel 40 is implemented using data structures and functions. Following are data structures describing the message queue design:

```
/* Message queue head */
typedef struct_MSGQ {
    NPMSGELEM    npmeHead;    /* Current Head of the queue */
    NPMSGELEM    npmeTail;    /* Current Tail of queue */
} MSGQ;
typedef MSGQ NEAR *NPMSGQ;
/* Structure to store actual messages */
typedef struct_MSGELEM {
    MSG    msg;
    struct_MSGELEM NEAR *npmeNext;
} MSGELEM;
typedef MSGELEM NEAR    *NPMSGELEM;
```

These message queues essentially consist of a linked list of messages attached to a message queue head. A linked list is used primarily to avoid imposing static limits on the size of the message queue, and to allow the flexibility of removing messages in an arbitrary order rather than first in-first out.

To reduce the boundary conditions and critical sections, an empty message buffer is always kept at the end of the queue for the next message. A tail pointer points to this empty message buffer. A head pointer always points to the first available message. As a result, the head is never the same as tail whenever there are valid messages. A counting semaphore, maintained in the office machine OS kernel, is used to identify the queue empty condition. The counting semaphore prevents access to head if the queue is empty, and also provides the blocking semantics of the call. The queue full condition is an error condition returned only when the system is too low on memory to allocate a new message buffer.

The following are the primary functions used in communication with the office machine OS kernel.
POSTAPPMESSAGE
Call:
BOOL PostAppMessage (HTASK hTask, WORD wMsg, WPARAM wParam, LPARAM lParam)
Parameters:
hTask: Task to which the message is to be posted
wMsg: Message to be posted
wParam, lParam: Parameters of the message.
Return Value:
True/false depending on success.

The PostAppMessage 84, 86 function is used by all office machine processes to post messages and may be called at interrupt time as well. This routine first determines whether the process for which the message is posted is maintained by the user module 80 using calls provided by the office machine OS kernel 40. If so, it calls a similar PostAppMessage () function provided in the user module 80 to do the job. Otherwise, it gets a new message buffer, and then inserts this into the message queue for the process within an interrupt critical section. Finally, it copies the message contents into the appropriate buffer and increments the counting semaphore using office machine OS kernel calls.
GETMESSAGE
Call:
BOOL GetMessage (LPMSG lpMsg, HWND hwnd, WORD wMsgFiltMin, WORD wMsgFiltMax)
Parameters:
lpMsg: Long pointer to buffer in which the received message will be put.
hwnd: Identifies window for which messages are to be retrieved. NULL for all background processes.
wMsgFiltIn, wMsgFiltOut: Specify filters for messages to be retrieved. Zero for all background processes.
Return Value:
True if any message other than WM_QUIT or IF_QUIT is returned; and Zero if any of them is retrieved.

GetMessage, like PostMessage, first finds out whether it needs to call the user module to perform the function. If so, it passes the whole call to a GetMessage function in the user module 80 and returns the same value. If not, it decrements the counting semaphore to make sure there is a message, and proceeds to unlink the head message within an interrupt critical section. If there are no messages in the queue, the process blocks in the counting semaphore.

GetMessage only returns the first message in the queue in this implementation. Because the message queue is a linked list, messages can be accessed arbitrarily.

The communication scheme described above is highly compatible with the messaging scheme for the Windows operating system. Application programs may communicate with the user module using the standard Windows API. In addition to using the standard Windows API, application programs may communicate with the messaging subsystem of the office machine OS kernel using the messaging functions described above, which are very similar to functions in the standard API. As a result, software developers familiar with the standard Windows API can easily create applications for this system.

Having now described communication among processes in the operating system, it is now possible to describe process scheduling. The operating system has a non-preemptive scheduler for scheduling foreground processes such as Windows applications, and a preemptive scheduler for scheduling real-time processes such as office machine background processes. In this embodiment, the Windows kernel 42 supports non-preemptive scheduling while the office machine OS kernel 40 provides preemptive scheduling. First the non-preemptive scheduler of the Windows Kernel will be described, and then two implementations of a scheduler in the operating system will be described. Though the scheduler of the operating system in this embodiment is implemented in two separate kernels, it should be understood that the scheduler could be implemented in a single kernel. Other variations in scheduler implementation exist, but in each, the scheduler provides preemptive scheduling to support real time applications.

The Windows kernel 42 provides non-preemptive scheduling. The Windows kernel has a priority based scheduler. The manner in which priority is assigned to the non-preemptive processes is not critical to the invention and may be implemented in various ways. Basically, processes are executed in the order in which they are listed in a linked list of processes. Processes are executed in a round robin fashion. The scheduler within the Windows kernel 42 only attempts to schedule a process when a current process makes a yield call to the Windows kernel 42. In a standard Windows configuration, the user module 80 makes a yield call on certain messaging calls like GetMessage. Because the non-preemptive processes make frequent yield calls in the process of checking the message queue, each process does not have to wait too long to be executed.

Figure 4:
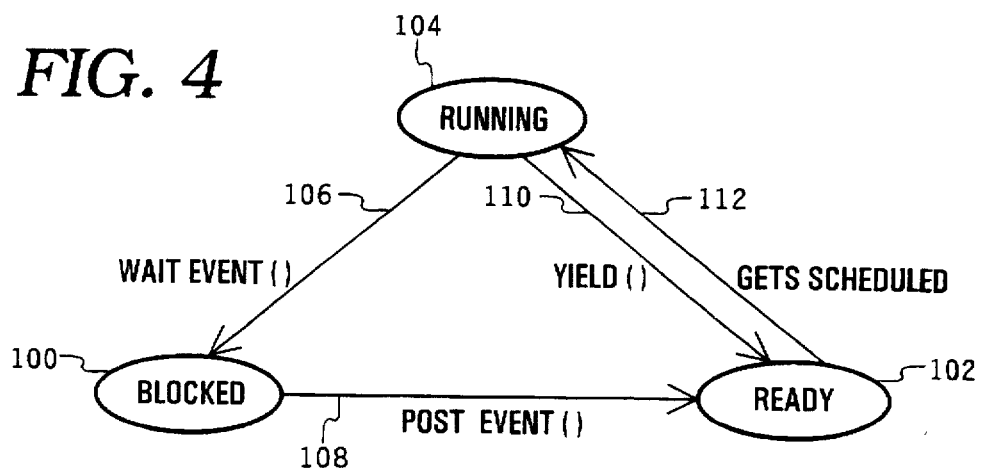
FIG. 4 is a process state diagram of a non-preemptive scheduler from the perspective of an operating system kernel.

FIG. 4 is a process state diagram of the non-preemptive scheduler from the perspective of the Windows kernel 42. The non-preemptive Windows processes 82 can be in one of three states: blocked 100, ready 102, and running 104. This diagram illustrates transitions between states and the events that trigger the transitions. The user module 80 controls transitions among states by making the appropriate calls to the Windows kernel 42. To control transitions to the blocked and ready states 100, 102, the user module 80 calls WaitEvent 106 and PostEvent 108, two standard APIs for the Windows kernel 42. PostEvent 108 and WaitEvent 106 manipulate an event semaphore in the Windows kernel 42. The Windows kernel 42 can them determine the state of processes by examining a value in the event semaphore. To control transitions from the running (104) to the ready (102) state, the user module 80 makes a yield call 110 to the Windows kernel 42. The Windows kernel 42 schedules all ready processes in a non-preemptive manner. When scheduled (112), the process transitions from the ready (102) to the running state 104.

Figure 5:
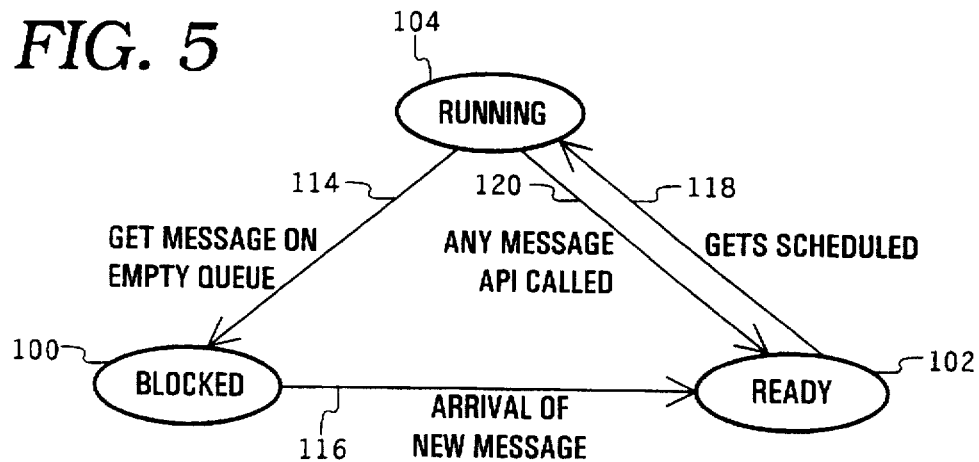
FIG. 5 is a process state diagram of a non-preemptive scheduler from the perspective of the user module in an embodiment of the invention.

FIG. 5 is a process state diagram of the non-preemptive scheduler from the perspective of a process interacting with the functions provided by the user module 80. When viewed together, FIGS. 4 and 5 show the complete picture of state transitions of a Windows process 82. When a process makes a GetMessage call 114, the user module 80 makes the WaitEvent call (106) to the Windows kernel 42 and the process is blocked (100). When a new message arrives (116) in the message queue for the process, the user module 80 makes a PostEvent call 108 and the process is ready (102) for scheduling. Once ready for scheduling, the Windows kernel 42 schedules the process (118), and it begins to run (104). When a running process calls any Windows message API (120), the user module 80 makes a yield call 110, and the process transfers from running to a ready state 104, 102. In this manner, Windows and foreground processes 82, 84 may be scheduled non-preemptively in the operating system.

To guarantee that a real time process is scheduled within a predictable period of time, the scheduler within the operating system must implement preemptive process scheduling. Preemptive scheduling generally means that a higher priority process will "preempt" a currently executing process. By enabling a higher priority process to preempt another process, the operating system can guarantee that the highest priority process will get executed within a known period of time once it has "awoken."

Generally preemptive scheduling is implemented as follows: 1) an interrupt is hooked so that a preemptive scheduler gets control at an interrupt time; 2) the stack of the processor is changed at the interrupt time so that the interrupt returns to a yield procedure of the preemptive scheduler; and 3) the preemptive scheduler then reschedules the current highest priority task. In effect, the processor stack is made to look as if the original process made a yield call to the preemptive scheduler. Through this yield call, the preemptive scheduler is able to obtain control and schedule a preempting process.

The interrupt used in preemptive scheduling could be any of several types of interrupts generated by an interrupt module. This implementation includes a timer interrupt, generating an interrupt every n milliseconds to ensure that the preemptive scheduler periodically gains control of the processor. However, a variety of hardware or software interrupts could also cause control to pass to the scheduler. For example, an interrupt could be generated in response to a user pressing a key on a keypad of the office machine, or in response to an incoming call signal. The interrupt could also be generated by software, triggering an interrupt in the processor using a processor instruction.

There are a variety of ways to implement the preceding scheduling scheme depending on the platform where the operating system will be installed. The preemptive scheduler must have a mechanism to obtain control of the processor either every n milliseconds and/or upon "events", such as interrupts generated by hardware or software. The preemptive scheduler must also determine whether it can preempt the currently running process. The preemptive scheduler obtains control as if it were a software interrupt. Important constraints in this environment are the limitations that the software interrupt in which the preemptive scheduler obtains control cannot interrupt another ISR or a real mode BOSS service.

In this implementation, the system driver 60 hooks the timer interrupt directly. At every timer interrupt, it first chains the interrupt to a timer ISR in the BOSS 22, and then processes the interrupt itself. The system driver 60 provides a function that the preemptive scheduler may call to set a periodic timer request. Each time the timer goes off, the system driver makes a callback function to the preemptive scheduler at interrupt time. Using this function, the preemptive scheduler can hook the timer interrupt every n milliseconds.

To avoid interrupting another ISR or real mode BOSS service, the system driver checks information in the ISR register and current stack segment. It checks the ISR register to make sure there are no pending hardware interrupts before performing the callback function. To make sure a real mode service is not being interrupted, the system timer checks the current stack segment and determines whether it is in real or protected mode. If in real mode, control is returned to the real mode service. Otherwise the current process is preempted.

To preempt a current process, the preemptive scheduler operates as follows. The contents of the stack at the time the callback function gets control are determined from the timer ISR of the system driver. From this information, the instruction currently being executed can be identified. In an Intel processor from the x86 family, CS:IP identifies this instruction. IP stands for instruction pointer and is a register containing an offset of the instruction currently being executed. CS stands for code segment and is a register that contains a selector for the code segment containing the instruction currently being executed. The CS:IP of the interrupted code is then replaced with the CS:IP of a stub yield procedure. When the interrupt returns, the stub yield procedure gets control. The stub part of the yield code then pushes the CS:IP of the interrupted code, flags to simulate an interrupt, and jumps to the real yield procedure.

In preempting a currently executing process, the operating system must avoid reentrancy problems. In a system that is non-preemptive such as the Windows Operating System, much of the code is non-reentrant. If a process is non-reentrant, then it may not be preempted and then reentered while in a preempted state. Windows processes cannot be preempted and then reentered. Due to the Windows display paradigm, it is not possible to timeslice among Windows processes using the display. The problem arises because these Windows processes each call the same standard Windows modules like the user module which are not re-enterable. Background processes, however, do not make direct calls to the user module or use the display. As such, background process can be preemptively timesliced with foreground processes with minimal reentrancy problems.

The general strategy for minimizing reentrancy problems is to treat all foreground processes as a single monolithic process called the "system process" that may be timesliced with background processes. Foreground processes may include Windows processes, office machine foreground processes, and office machine I/O processes. Background processes include background office machine processes. This grouping, which is reflected in the separation of applications in FIG. 2, avoids reentrancy problems with processes using the display. Because background processes still may make calls to non-reentrant code, reentrancy problems still may occur, though less frequently. Remaining reentrancy problems may be addressed in a variety of ways. Examples of solutions to these problems will be described with reference to specific scheduler embodiments.

The preemptive scheduling outlined above may be implemented in a number of ways. In the scheduler embodiments described below, the scheduler is implemented using the Windows kernel 42 and the office machine OS kernel 40. Conceptually, the scheduler can be thought of as residing in a single operating system kernel 26 as depicted in FIG. 1. For the purposes of describing the operating system, however, it is helpful to describe the detailed implementation of the scheduler, including both non-preemptive and preemptive scheduling, at a lower level.

The scheduler in the following embodiments takes advantage of the functionality in the Windows kernel 42. The Windows kernel 42, user module 80, and office machine OS kernel 40 all play a role in process scheduling. All processes look the same to the Windows kernel 42—each appears as a Windows process. By controlling the event semaphore in the Windows kernel 42, the user module 80 controls scheduling of foreground processes 70 including Windows processes 82 and office machine foreground processes 84. The office machine OS kernel 40 controls the scheduling of background office machine processes 86. The Windows kernel 42 maintains information on the state of the system in a data structure, and thus, needs to be aware of the currently executing process. To accomplish this, the Windows kernel performs the context switching among processes. The Windows kernel can, therefore, maintain accurate state information on the current process.

The Windows kernel 42 also provides directed yield and block functions. This enables a process to explicitly specify the next process to be scheduled when it yields or blocks. The office machine OS kernel 40 uses the directed yield and block functions to implement preemptive scheduling.

The implementation of the scheduler may depend upon the sophistication of the office machine and the type of application programs that it will support. A lower end office machine may not support graphical windowing processes such as Windows programs. The operating system may support only foreground processes relating to office machine I/O and background processes. In this case, the office machine OS kernel 40 would treat all processes as background processes and schedule all processes preemptively. A higher end office machine may include graphical windowing processes like Windows applications as well as both office machine foreground and background processes. In this case, the Windows applications and office machine foreground processes would be treated as a single "system" process. The processes within this system process would be scheduled non-preemptively, and the system process and background processes would be scheduled preemptively by alternating time slices.

Figure 6:
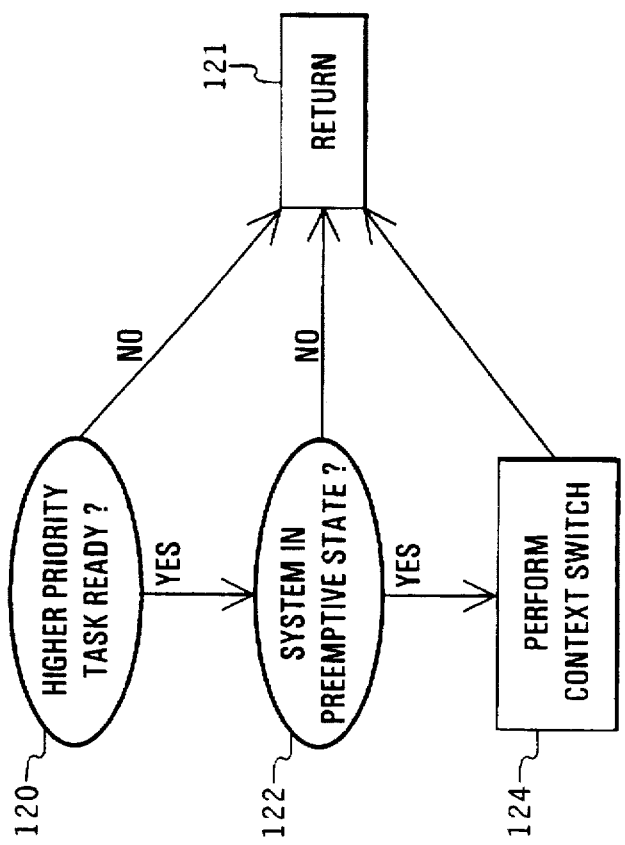
FIG. 6 is a flow diagram of a scheduler according to a first embodiment of the invention.

FIG. 6 is a flow diagram of a scheduler according to a first embodiment of the invention. This scheduler would typically be implemented in a low end office machine having only office machine foreground and background processes. The office machine OS kernel 40 treats all processes as real time background processes and schedules all processes preemptively. FIG. 6 depicts the operation of the scheduler at each preemption point, i.e. in one embodiment at every n milliseconds when preemptive scheduler in the office machine OS kernel 40 obtains control.

First, the preemptive scheduler checks its internal data structures to see whether a higher priority task needs to be scheduled (120). The process for determining whether a higher priority task is ready is described with reference to the scheduler data structures below. If no higher priority task is ready, control returns to the Windows kernel until the next preemption point (121).

Next, the preemptive scheduler checks to determine whether the current process may be preempted (122). To do this, it compares the code segment of the process or DLL being preempted with a list of code segments of non-reentrant modules in the operating system to determine whether the process or DLL being preempted is non-reentrant. The preemptive scheduler also checks whether the process or DLL to be preempted is in a critical section. If either a reentrancy problem or critical section exists, the preemptive scheduler does not call the Windows kernel 42 to perform a context switch.

However, if neither of the preceding conditions exist, then the preemptive scheduler calls the Windows kernel to perform a context switch (124).

Figure 7:
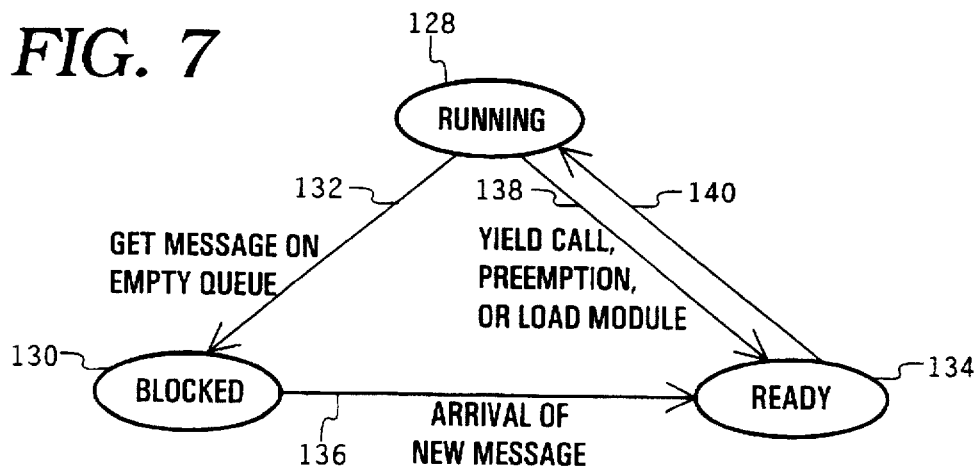
FIG. 7 is a process state diagram of an operating system according to a first embodiment of the invention.

FIG. 7 is a process state diagram of the processes in an operating system according to the first embodiment of the invention. This diagram illustrates transitions between states and the events that trigger the transitions. The process state diagram is the same for both background and foreground processes because both types of processes are treated alike.

Transitions among states occur in the following manner. A running (128) process transitions to the "blocked" state 130 when it makes a GetMessage call 132 on an empty message queue. A blocked process transitions to a ready state 134 when a new message arrives (136) for the blocked process. A running (128) process transitions to the ready state 134 in three instances: 1) when it makes a yield call, 2) on LoadModule call, which occurs when a new process is created, and 3) when the office machine OS kernel preempts the running process (138).

Only processes in the ready state are scheduled (140). The Windows kernel 42 schedules the first process to become ready (134). After this first process is scheduled, the preemptive scheduler takes over the scheduling until the last process blocks (i.e., makes a GetMessage call on an empty queue). When no process is ready to be scheduled, control stays within the Windows kernel 42.

In a high end intelligent office machine, scheduling becomes more complex because foreground and background processes are scheduled differently. As described previously, foreground processes such as standard Windows processes cannot be preemptively scheduled because of reentrancy problems. To address this problem, foreground processes 70, including Windows processes and office machine foreground processes, are treated as one scheduable entity by the OMOS kernel, the system process. The system process is allocated a portion of processor time, typically 50% of the time slices, and is scheduled preemptively with background processes.

Reentrancy problems can still occur when background processes attempt to call a preempted system DLL. The low end office machine embodiment employs a code segment checking process to determine whether preemption is proper. This solution is not as efficient, although it is still usable, in higher end machines where many more segments would have to be checked. As an alternative solution in the high end office machine, all calls to a system process by a background process are trapped by the office machine OS kernel 40. During the call, the background process is treated temporarily as a system process and scheduled non-preemptively by the Window kernel 42. Once the call is completed, the process reverts to a background process so that it may be scheduled preemptively. Any remaining reentrancy problems are addressed by the code segment approach.

Figure 8:
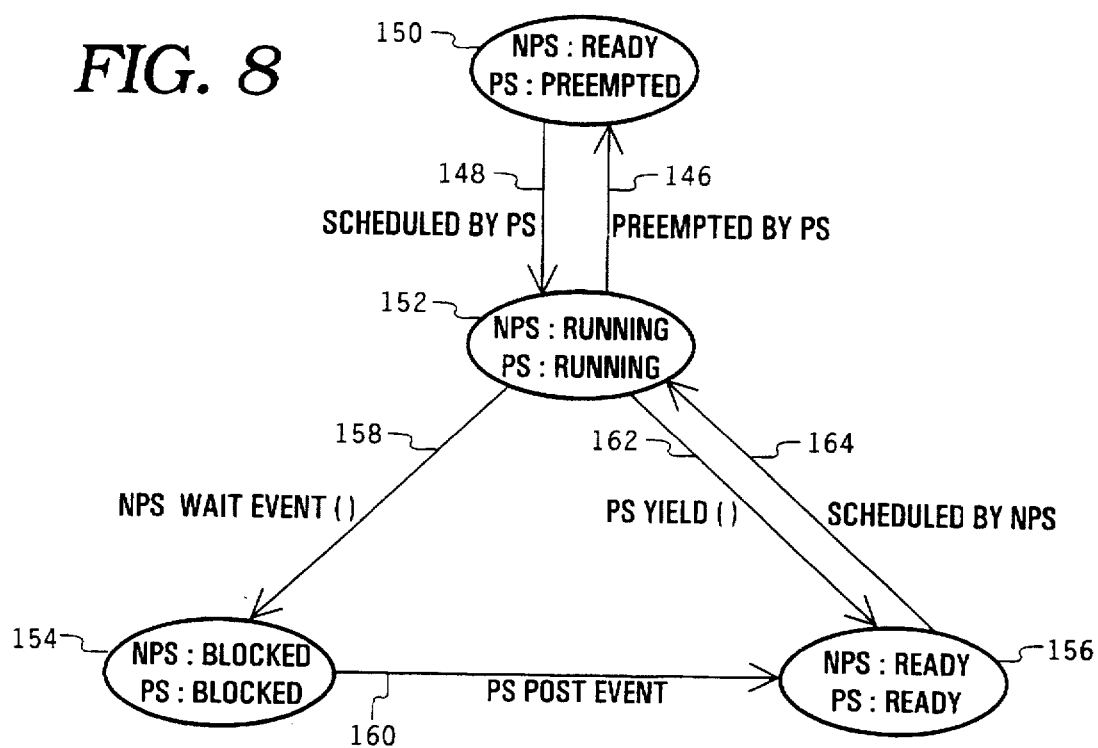
FIG. 8 is a process state diagram of system processes in an operating system according to an alternative embodiment of the invention.
Figure 9:
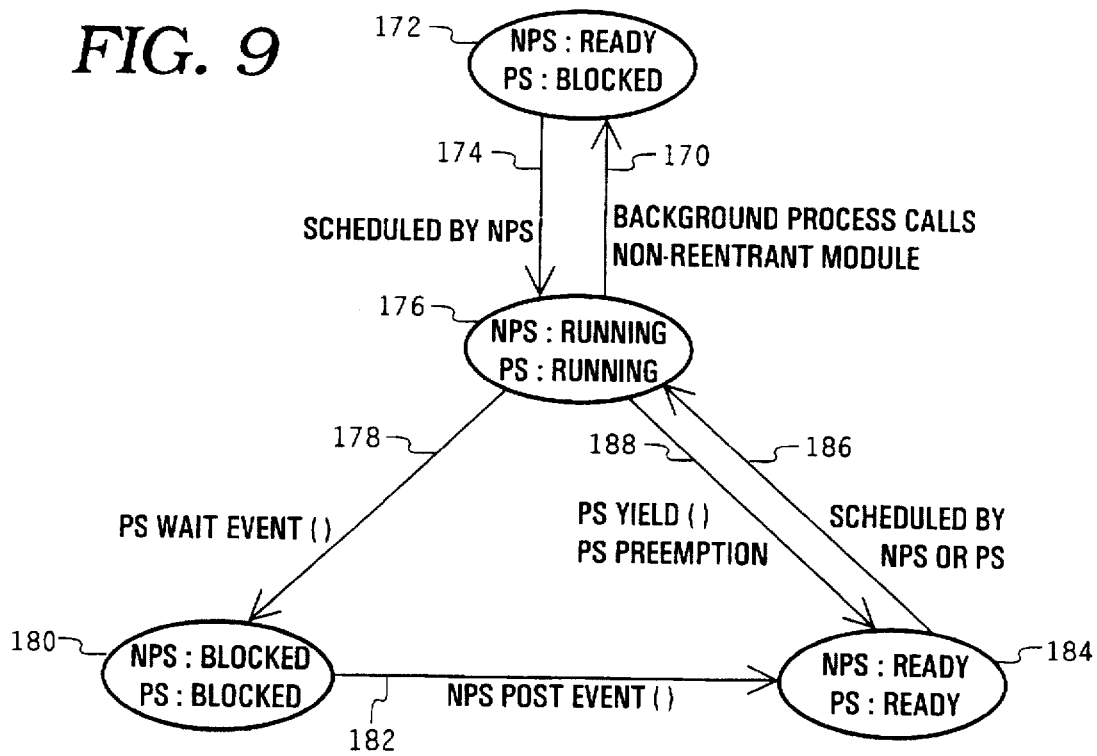
FIG. 9 is a process state diagram of background processes in an operating system according to an alternative embodiment of the invention.

FIGS. 8 and 9 are process state diagrams for a high end office machine embodiment. FIG. 8 illustrates the process state diagram of a foreground process. Foreground processes are treated as one system process. FIG. 9 illustrates the process state diagram of an office machine background process. These background processes are real time processes that are scheduled preemptively with the system process. Though similar to the process state diagrams of FIGS. 4 and 7, the process state diagrams are more complex because foreground and background processes are scheduled differently. Since a process may be in different states in the preemptive and non-preemptive scheduler, the diagrams show the state of the process from the perspective of each scheduler for each state transition. The process state diagram of a foreground process, depicted in FIG. 8, illustrates the transitions among states of a foreground process in both the preemptive and non-preemptive scheduler. The abbreviations, NPS and PS, stand for non-preemptive scheduler and preemptive scheduler, respectively.

The state of the foreground process is the same in each scheduler for each transition except when the foreground process is preempted by the preemptive scheduler (146). In this case, the foreground process transitions to the ready state in the non-preemptive scheduler while it is preempted by the preemptive scheduler (150). Once the preemptive scheduler again schedules the preempted process (148), it is in the running state in both the preemptive and non-preemptive schedulers (152). The preemptive scheduler schedules the preempted process for execution on the next time slice.

Aside from the case where a foreground process is preempted, it is scheduled in all other respects as described with reference to FIGS. 4 and 5. Unless preempted, a foreground process transitions among running (152), blocked (154), and ready (156) states just as in FIG. 4. A transition from a running state 152 to a blocked state 154 occurs on a WaitEvent call 158 to the Windows kernel. A transition from the blocked state 154 to the ready state 156 occurs on a PostEvent call 160 to the Windows kernel. A running process transitions to the ready state 156 on a yield call 162, and a ready process gets scheduled by the non-preemptive scheduler 164. The non-preemptive scheduling is thus very similar to that depicted in FIG. 4.

The process state diagram of a background process, depicted in FIG. 9, illustrates the transitions among states of background process in both the preemptive and non-preemptive scheduler. The state of a background process is the same in each scheduler for each transition except when the background process calls a non-reentrant module in the operating system (170). In this case, the process is blocked in the preemptive scheduler, and it is ready for scheduling by the non-preemptive scheduler (172). Once scheduled by the non-preemptive scheduler (174), the background process transitions to the running state in both schedulers (176).

While a background process always communicates with the office machine OS kernel 40, it can be scheduled by either the non-preemptive scheduler or the preemptive scheduler. On a WaitEvent call 78 to the office machine OS kernel 40, the background process transitions from a running (176) to a blocked state 180 in both schedulers. On a PostEvent call 182 to the office machine OS kernel 40, the background process transitions from a blocked (180) to a ready state 184. Once in a ready state, the background process may be scheduled non-preemptively by the non-preemptive scheduler or preemptively by the preemptive scheduler (186). The background process transitions from a running state 176 in both schedulers to a ready state in both schedulers on either a yield call to the preemptive scheduler or if preempted by the preemptive scheduler (188).

Figure 10:
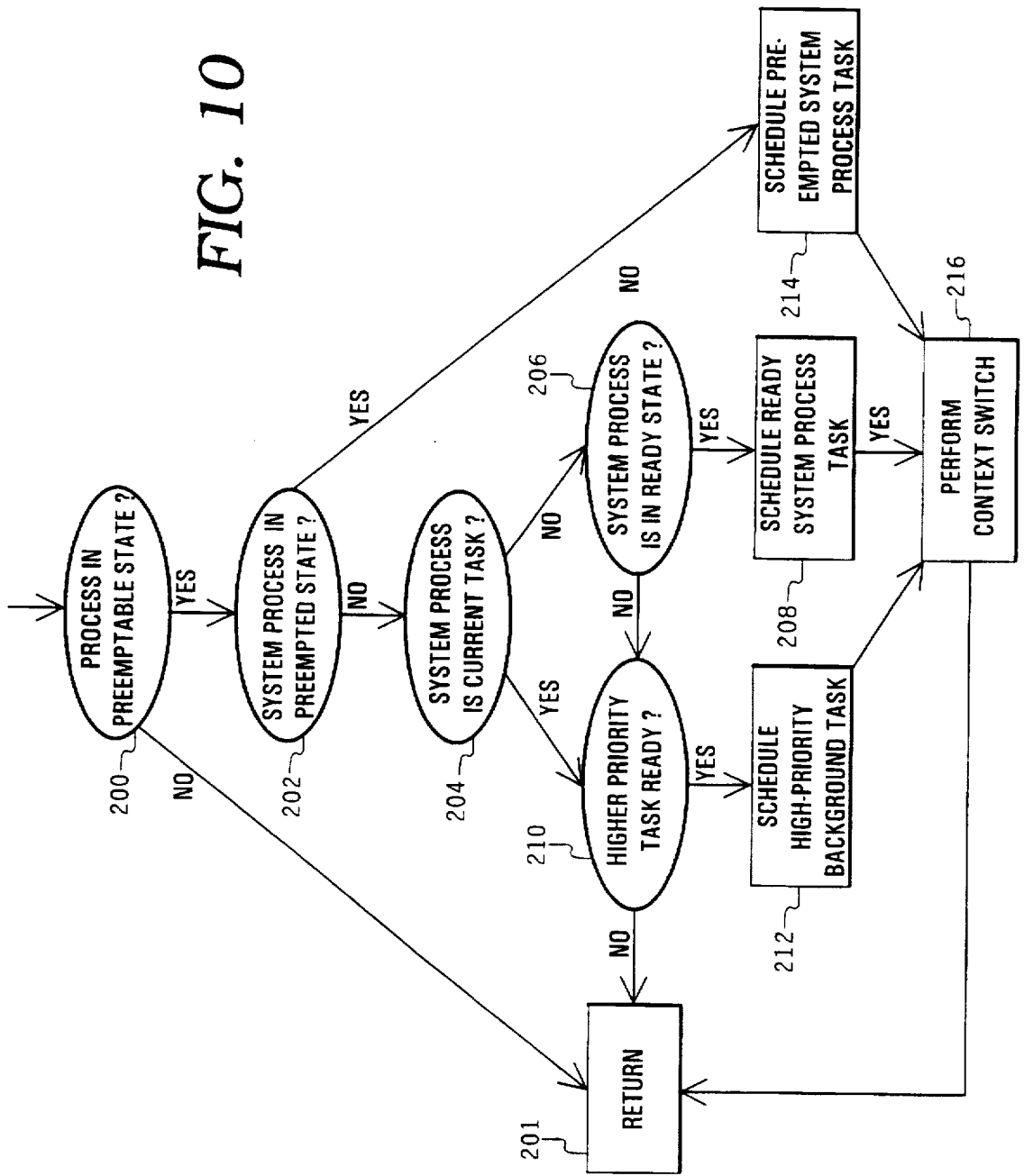
FIG. 10 is a flow diagram of a scheduler according to an alternative embodiment of the invention.

FIG. 10 is a flow diagram of a preemptive scheduler in a high end office machine embodiment. This flow diagram provides an example of how real time background processes may be preemptively scheduled with the system process. Processes are generally scheduled based on their priority. Processes with the same priority are scheduled in a round robin fashion.

The scheduler operates as follows. The first step involves checking whether the current process may be preempted (200). This is where the reentrancy problem is addressed. In this implementation, the reentrancy problem is addressed by treating all foreground processes as the system process for scheduling purposes. In addition, some key portions of the operating system such as the memory management and scheduling portions cannot be preempted. To make sure none of this code is preempted, the process of checking code segments to determine if these portions are currently executing is used.

If the current process cannot be preempted, then the scheduler returns control (201) to the process in control at the preemption point.

If the current process is preemptable, then the scheduler determines whether a system process is currently being preempted (202). To accomplish this, a state variable is checked to see whether a system process was preempted in the last time slice. This checking is discussed below in further detail with reference to the scheduler data structure.

If a system process is not preempted, the scheduler determines whether the currently executing process is a system process (204). The process may be checked in a variety of ways. To check quickly, the current process is cached in the office machine OS kernel 40 as being either a background process or a system process. This cached variable is checked against the current process ID, and if they match the current state is used. If the state does not match, the type of the current process may be determined in a variety of ways. One way is maintain a list of background processes, search this list, and then assume that the current process is a system process if no match is found. Another way is to store a type ID for the process so that the type can be found in one look-up.

If a system process is not the current process, then the next step is to determine whether a system process is in the ready state (206). This determination may be made in a variety of ways. One way to accomplish this is to maintain a process list, and then search this list to determine whether a system process is ready.

If a system process is ready, then the scheduler sets the current state to indicate that a system task is running, and then does a directed yield to the newly ready system process (208).

If a system process is the current process, then the next step is to determine whether a higher priority background process is ready (210). To determine this, an internal data structure having information on background processes is checked to see whether a higher priority process needs to be scheduled.

If a higher priority process needs to be scheduled, the scheduler sets the current state to the higher priority process and does a directed yield to it (212). The scheduler may set the state variable indicating that the system process is in a preempted state and save the type ID if control came directly from step (204).

If a system process is in a preempted state, the scheduler resets the state variable indicating a preempted system process and does a directed yield to the previously saved system process (214). The scheduler also sets the current state to indicate that a system task is running.

When either a higher priority background process, a ready system process, or a preempted system process needs to be scheduled the scheduler calls the Windows kernel to perform a context switch (216).

The scheduler may be implemented using the following data structures. To clarify, the term "task" is interchangeable with the term, "process."

ready state. The complete linked list is used to keep all active processes in an accessible place—either for searches to identify process handles, or to implement a message broadcasts, for example. A handle is simply a number identifying a particular process. To increase the efficiency of scheduling operations, the run queue only stores processes that are in the ready state.

The most frequent operation in the data structure is determining whether a higher priority process is ready. To make this as efficient as possible, the current highest priority process is stored in a global variable npprCurHighPriTask. At each time slice, the currently executing task handle can be compared with the task handle of this process (npprCurHighPriTask→hTask) to see if it matches. The value of this variable can only change on events that change the state of a process or change the priority of a process, all of which occur with much lower frequency. On each such event, the value of this variable is recomputed. Since the run queue only contains processes ready to run, the expected number of processes in this structure is very small. With a small number of processes, the most efficient way to recalculate this variable is a simple linear search through the array. Other forms of searching, however, may also be used.

The variable npprCurTask stores a pointer to the last process scheduled by the preemptive scheduler. The value of npprCurTask is NULL if a system process was scheduled, in which case hCurSysTask holds the handle to that process. hPreemptedSysTask stores the handle to any system process which was preempted at the last time slice; it is NULL otherwise.

While the operating system is described in detail with reference to particular embodiments, it should be understood that the invention can be implemented in a variety of ways. For example, instead of using separate kernels, the preemp-

```
// Task Data Structure
typedef struct_PROCESS {
    HTASK         hTask;            // Windows kernel task handle
    SHORT         sWakeSem;         // Stores state of the process
    WORD          wPriority;        // Stores the priority
    NPMSGQ        npmq;             // Message queue for the process
    WORD          wRunqIndex;       // Stores index in run queue
    struct_PROCESS NEAR *nppr Next; // Next process structure
#ifdef EFAX
    BOOL          fTempSysProc;     // Indicates whether process is temporarily
                                    // becoming part of the system process
#endif
} PROCESS;
typedef PROCESS NEAR    *NPPROCESS;
// Constant definitions
#define MAX_NUM_PROCESS 20          // maximum number of background
                                    // processes allowed
// Global Variables (within the process submodule)
NPPROCESS     npprHead;             // points to list of all background processes
NPPROCESS     rgnpprRunQ[MAX_PROCESS];// Actual run queue
WORD          wRunQSize;            // Stores active size of run queue
NPPROCESS     npprCurHighPriTask;   // Stores highest priority task
NPPROCESS     npprCurTask;          // Stores handle to cached current task
HTASK         hCurSysTask;          // Stores handle to current system task
#ifdef EFAX
// Extra global variables for high end office machine platforms
HTASK         hPreemptedSysTask     // Stores the handle to the preempted
                                    // system task if one exists - NULL
                                    // if none
#endif
```

Two global data structures may be maintained: a simple linked list pointed to by npprHead that contains all background processes in the system, and a run queue arranged as an array of pointers to processes that are currently in the tive and non-preemptive schedulers may be implemented in a single kernel as shown in FIG. 1. The messaging services in the system can be implemented in a single messaging subsystem as opposed to using messaging services in the user module and a messaging subsystem in the office machine OS kernel.

Having illustrated and described the principles of the invention in alternative embodiments, it should be apparent to those skilled in the art that the invention can be modified in arrangement and detail without departing from such principles. We claim all modifications and equivalents coming within the spirit and scope of the following claims.

We claim:

1. A method for supporting real time processing in a graphical windowing operating system for an office machine, the graphical windowing operating system having a non-preemptive scheduler for scheduling windowing applications, a preemptive scheduler for preemptively scheduling the windowing applications and real time applications, a first messaging subsystem for processing messages for the windowing applications, and a second messaging subsystem for processing messages for the real time applications, the office machine having a processor and memory, the method comprising:

separately controlling communication among the windowing applications with the first messaging subsystem, including posting messages and getting messages for each of the windowing applications in message queues allocated for the windowing applications;

controlling whether the windowing applications are in a blocked or ready state for scheduling in response to message calls to the first messaging subsystem from the windowing applications;

allocating message queues corresponding to the real time applications with the second messaging subsystem;

separately processing messages for the real time applications with the second messaging subsystem including posting and getting messages for each of the real time applications in the message queues allocated for the real time applications;

controlling whether the real time applications are in a blocked or ready state for scheduling in response to message calls to the second messaging subsystem from the real time applications;

allocating message queues for office machine foreground applications in the first messaging subsystem;

receiving message calls from office machine foreground applications in the second messaging subsystem to enable the office machine foreground applications to communicate with the real time applications;

determining whether any of the message calls received in the second messaging subsystem correspond to the message queues allocated for the windowing applications and the office machine foreground applications maintained by the first message subsystem;

making message calls on behalf of a first office machine foreground application in response to receiving a first message call in the second messaging subsystem that corresponds to one of the message queues allocated by the first messaging subsystem for either one of the windowing applications or one of the office machine foreground applications;

scheduling the windowing applications non-preemptively in a system process with the non-preemptive scheduler;

scheduling a first real time application and the system process preemptively by the following steps:

transferring control to the preemptive scheduler upon an interrupt generated by an interrupt module;

determining whether a currently running process can be preempted;

identifying whether the currently running process is in the system process;

determining whether the real time application is ready to be scheduled by the preemptive scheduler; and if the currently running process is in the system process and the real time application is ready to be scheduled, then preempting the currently running process by performing a context switch between the currently running process and the first real time application.

2. The method of claim 1 wherein the interrupt module includes a timer interrupt, and the preemptive scheduler obtains control of the processor every n milliseconds by the following steps:

hooking the timer interrupt so that the preemptive scheduler obtains control of the processor every n milliseconds; and changing a stack in the memory of the processor so that the timer interrupt returns to a yield procedure of the preemptive scheduler.

3. The method of claim 1 wherein the step of determining whether a currently running process may be preempted includes:

checking a code segment of the currently running process; and comparing the code segment of the currently running process with code segments of non-reentrant modules to determine whether control is within a non-reentrant module.

4. The method of claim 1 wherein the step of identifying whether the currently running process is in the system process includes:

caching the process type of the currently running process in a cached variable; and comparing the cached variable with a current process identification variable to determine whether the cached variable and current process identification variable match.

5. The method of claim 1 further including the steps of:

if the currently running process is not in the system process, then determining whether the real time application is a higher priority process than the currently running process according to the following steps:

comparing a variable identifying a highest priority process with a variable identifying the currently running process; and recomputing the variable identifying the highest priority process upon events that change a state or priority of a process.

6. A computer readable medium have computer executable instructions for performing the steps of claim 1.

7. The method of claim 4 further including the steps of:

storing the current process type identification variable in a scheduler data structure; and if the cached variable and the current process identification variable do not match, then determining process type by checking the current process type identification variable.

8. A method for supporting real time processing in a graphical windowing operating system for an office machine, wherein the office machine is selected from the group consisting of a fax machine, a scanner, a printer, and a copier, the graphical windowing operating system having a scheduler, and a first and a second messaging subsystem, the office machine having a processor and memory, the method comprising:

- separately controlling communication among windowing processes with the first messaging subsystem, including posting messages and getting messages for each of the windowing processes in message queues allocated for the windowing processes;
- controlling whether the windowing processes are in a blocked or ready state for scheduling in response to message calls to the first messaging subsystem from the windowing processes;
- allocating message queues corresponding to real time processes with the second messaging subsystem;
- separately processing messages for the real time processes with the second messaging subsystem including posting and getting messages for each of the real time processes in the message queues allocated for the real time processes so that the real time processes can operate independently of the windowing processes;
- controlling whether the real time applications are in a blocked or ready state for scheduling in response to message calls to the second messaging subsystem from the real time processes;
- allocating message queues for office machine foreground applications in the first messaging subsystem;
- receiving message calls from office machine foreground applications in the second messaging subsystem to enable the office machine foreground applications to communicate with the real time applications;
- determining whether any of the message calls received in the second messaging subsystem correspond to the message queues allocated for the windowing applications and the office machine foreground applications maintained by the first message subsystem;
- making message calls on behalf of a first office machine foreground application in response to receiving a first message call in the second messaging subsystem that corresponds to one of the message queues allocated by the first messaging subsystem for either one of the windowing applications or one of the office machine foreground applications;
- transferring control to the scheduler at an interrupt generated by an interrupt module;
- scheduling a first real time process at the interrupt by the following steps:
    - determining whether the first real time process is ready;
    - determining whether a currently executing process can be preempted; and
    - if the currently executing process can be preempted and the first real time process is ready, then preempting the currently executing process by executing a context switch between the currently executing process and the first real time process ready to be scheduled.

9. The method of claim 8 wherein the graphical windowing operating system includes a timer interrupt, and the transferring step includes:
- hooking the timer interrupt so that the scheduler obtains control of the processor every n milliseconds; and
- changing a stack in the memory of the processor so that the timer interrupt returns to a yield procedure of the scheduler.

10. The method of claim 8 further including the steps of:
- determining whether the first real time process is a higher priority process than the currently executing process according to the following steps:
    - comparing a variable identifying a highest priority process with a variable identifying the currently executing process; and
    - recomputing the variable identifying the highest priority process upon events that change a state or priority of a process.

11. The method of claim 8 wherein the step of determining whether the currently executing process can be preempted includes:
- checking a code segment of the currently executing process; and
- comparing the code segment of the currently executing process with code segments of non-reentrant modules to determine whether control is within a non-reentrant module.

12. A computer readable medium have computer executable instructions for performing the steps of claim 8.

13. An operating system for an office machine comprising:
- a first messaging subsystem operable to allocate and maintain message queues for windowing processes and office machine foreground processes, operable to post and get messages from the message queues to allow the windowing processes and the office machine foreground processes to communicate with each other;
- a second messaging subsystem in communication with the office machine foreground processes and office machine background processes, the second messaging subsystem operable to allocate and separately maintain message queues for the office machine background processes so that the office machine background processes can operate independently from the windowing processes, and operable to post and get messages for the office machine background processes to allow the office machine foreground and background processes to communicate with each other, the second messaging subsystem in communication with the first messaging subsystem for making message calls to the first messaging subsystem on behalf of the office machine foreground processes in response to receiving a message call in the second messaging subsystem that corresponds to one of the message queues allocated for the windowing processes by the first messaging subsystem to enable the windowing processes and the office machine foreground processes to communicate with each other;
- a non-preemptive scheduler in communication with the first messaging subsystem for non-preemptively scheduling the windowing processes and the office machine foreground processes in a system process;
- a preemptive scheduler in communication with the first and second messaging subsystems for preemptively scheduling the office machine background processes and the system process, the preemptive scheduler operable to determine priority of the office machine background processes, and operable to preemptively schedule the office machine background processes based on the priority of the office machine background processes; and
- an interrupt module in communication with the preemptive scheduler for issuing interrupts to cause the preemptive scheduler to schedule the office machine background processes.

* * * * *